United States Patent [19]

Veeneman et al.

[11] Patent Number: 5,386,459
[45] Date of Patent: Jan. 31, 1995

[54] METHOD OF DEFINING OPERATION OF SWITCHING SYSTEM PERIPHERALS

[75] Inventors: Ron C. Veeneman, Carleton Place; Sonya G. Fullarton, Ottawa; Dana C. Peters, Nepean; Michael C. Rehder, Kanata; K. Timothy Rose, Nepean; Jeff J. Tranter, Kanata; Andrew J. Weatherson, Carp, all of Canada

[73] Assignee: Mitel Corporation, Ontario, Canada

[21] Appl. No.: 41,955

[22] Filed: Apr. 2, 1993

[30] Foreign Application Priority Data
Apr. 3, 1992 [CA] Canada .................... 2065131

[51] Int. Cl.6 ........................... H04M 11/00
[52] U.S. Cl. ......................... 379/93; 379/96; 379/201
[58] Field of Search ............ 379/96, 97, 98, 94, 379/93, 90, 102, 104, 105, 201

[56] References Cited

U.S. PATENT DOCUMENTS

| | | | |
|---|---|---|---|
| 4,897,866 | 1/1990 | Majmudar et al. | 379/96 |
| 5,021,889 | 6/1991 | Yamamoto | 379/100 |
| 5,241,588 | 8/1993 | Babson, III et al. | 379/94 |

Primary Examiner—Curtis Kuntz
Assistant Examiner—Stella L. Woo
Attorney, Agent, or Firm—Charles E. Wands

[57] ABSTRACT

A method of defining the operation of switching system peripherals is comprised of storing a software program for operating the peripherals in a switching system; storing at least one table of data for access by the program for defining operating parameters of a corresponding at least one peripheral; modelling a prototype of the peripheral in a remote host system by creating a human-machine-interface simulating the peripheral; storing a control table of data corresponding to the modelled prototype in a memory for the host system; and downloading the control table into the one table, whereby operation of the peripheral is controlled by the operating software programs and the data in the at least one table.

10 Claims, 8 Drawing Sheets

| FUNCTION INDICATORS |||
|---|---|---|
| NIL | CANCEL | PRIME LINE |
| HOLD | TRANSFER | CALL FORWARD |
| MICROPHONE | REDIAL | CALL BACK |
| SPEAKER | MESSAGE | MUSIC |
| SUPERKEY | HEADSET | |

| SETTING: | OFF | ON |
|---|---|---|
| | FAST FLASH | SLOW FLASH |

FIG. 6

| SOUNDS |||
|---|---|---|
| TONE: | | |
| NO CHANGE | DIAL | BUSY |
| NONE | RINGBACK | |
| SILENCE | REORDER | |

| RINGING: | NO CHANGE | NONE |
|---|---|---|
| | STANDARD | DISTINCTIVE |

FIG. 7

METHOD OF DEFINING OPERATION OF SWITCHING SYSTEM PERIPHERALS

FIELD OF THE INVENTION

This invention relates to the field of telephone systems and in particular to a method of defining the operation of telephone sets and other peripherals associated with a telephone system.

BACKGROUND TO THE INVENTION

Telephone companies have in recent years been increasing the range of features offered to subscribers, and in order to easily make use of those features, telephone sets having displays and feature accessing pushbuttons have come into common use. Examples of such telephone sets are SUPERSET 4 TM and other versions of that family of telephone sets. Each telephone set version has a different arrangement and number of pushbuttons from another in order to enable easy operation of particular features. The displays are used for composing and receiving messages, and for displaying the function of "soft keys", whose designation changes depending on the feature or step in a sequence invoked by a user, or as commanded by software programs. Other displays indicate the status of telephone line pushbuttons, such as ringing, busy, idle, hold, etc.

The SUPERSET TM series of telephone sets has been designed as "dumb" sets, that is, they merely react to commands sent to them for operation from the switching system to which they are connected. The switching system contains programs which, when enabled, cause the displays to operate, cause the switching system to send signals in response to the detection of the depression of pushbuttons, etc. The status of each display indicator and each character in the display is formulated at the switching system and is transmitted as a signal to each telephone set. Other telephone sets may be "intelligent" in that at least some software programs are stored within the telephone set and are invoked upon receiving commands from the switching system for operating the display, sending signals, etc.

Whether the telephone sets are dumb or intelligent, whether the telephone set operation programs are stored within the telephone set, within the peripheral control system associated with the switching system, or whether they are stored in a memory associated with a central processor for controlling the switching system, the operation programs for driving particular forms of telephone sets are specific to each type of telephone set. The result is that if a subscriber desires to upgrade or downgrade his telephone set (i.e. to be able to access a greater number or fewer number of features), there must be change to the operating or driving software specific to that telephone line. In addition, in case other versions of telephone sets become available which have variations of features, different combinations of features or different features from those previously contemplated, a significant change in the operating software is required. Thus when changes to accommodate changed or new forms of telephone sets are required to be effected, significant cost is incurred.

It should be noted that in this specification the term "switching system" is intended to mean any form of communication system which utilizes peripherals, whether using time division or space division switching, communication via a network such as a local area network, etc. Peripherals is intended to mean telephone sets, trunks, special service circuits, etc.

SUMMARY OF THE INVENTION

In accordance with the present invention, a remote host system such as a computer system is used to model a prototype of a peripheral whose characteristics are to be defined. The model is effected by displaying on a display screen (referred to herein as a display), a graphic which simulates the peripheral itself. A telephone set will be used as an example herein, but it will be recognized that other peripherals such as trunks can be easily modelled.

The model which is graphically displayed is that of a prototype of the peripheral, not only in form on the screen, but also in operation. Therefore, for example, if the graphic displays a button which is designated to cause a certain feature to operate, pointing and clicking by use of a computer control mouse, for example, will cause the prototype to operate as if it were real.

Once the prototype of the peripheral has been modelled, a control table of data relating to operation of the specific form of prototype is created and locally stored. That data is then downloaded to the switching system to which the peripheral is connected. The software programs for operating a single or group of peripherals are stored in the switching system, and access the table of data corresponding to the modelled prototype in order to cause operation of a real peripheral in accordance with the modelled prototype.

As a result, the telephone company owning the switching system need only operate the prototype modelling system when peripherals are to be updated or changed, or when new peripherals having new features are added to the system. That company is thus freed from having to purchase the services and the software of the switching system manufacturing company to change the switching system programs in such instances. The result is increased flexibility, the ability to easily withdraw or add features to existing telephone sets, to change the designations of telephone pushbuttons, and to facilitate the addition of new types of telephone sets in a cost effective and simple manner. This affords great advantage to the telephone system owner.

In accordance with an embodiment of the invention, a method of defining the operation of switching system peripherals is comprised of storing a software program for operating the peripherals in a switching system, storing at least one table of data for access by the program for defining operating parameters of a corresponding at least one peripheral, modelling a prototype of the peripheral in a remote host system by creating a human-machine-interface simulating the peripheral, storing a control table of data corresponding to the modelled prototype in a memory of the host system, and downloading the control table into the aforenoted at least one table, whereby operation of the peripheral is controlled by the operating software programs and the data in the aforenoted at least one table.

Preferably, the modelling step includes displaying a graphic human-machine-interface (HMI) on a display which simulates the face and forms of pushbuttons, keys, and displays (if any) of the telephone sets, enabling operation of the pushbuttons and keys on the graphic human-machine-interface and operating a telephone set simulation program to verify correct and desired operation of the control table of data.

The modelling step thus encapsulates the human-machine-interface definition of the telephone set as data, as opposed to tying the human machine interface directly to the controlling software. That data can be changed by subsequent modelling steps. The definition of which soft keys and text strings to be selected and displayed on the telephone, reflects the choices made. The data encapsulation removes the requirement of providing a human-machine-interface definition of the particular set connected to a particular line from the telephone set controlling programs, allowing such programs to be generic for various types of peripherals, and thus less expensive when changes or additions are to be adopted.

BRIEF INTRODUCTION TO THE DRAWINGS

A better understanding of the invention will be obtained by reference to the detailed description below, in conjunction with the following drawings, in which:

FIG. 6 illustrates a graphic of a window of line key indicators of a simulated telephone set;

FIG. 7 illustrates a graphic of a window used for call progress tone customization;

DETAILED DESCRIPTION OF THE INVENTION

Figure 1:
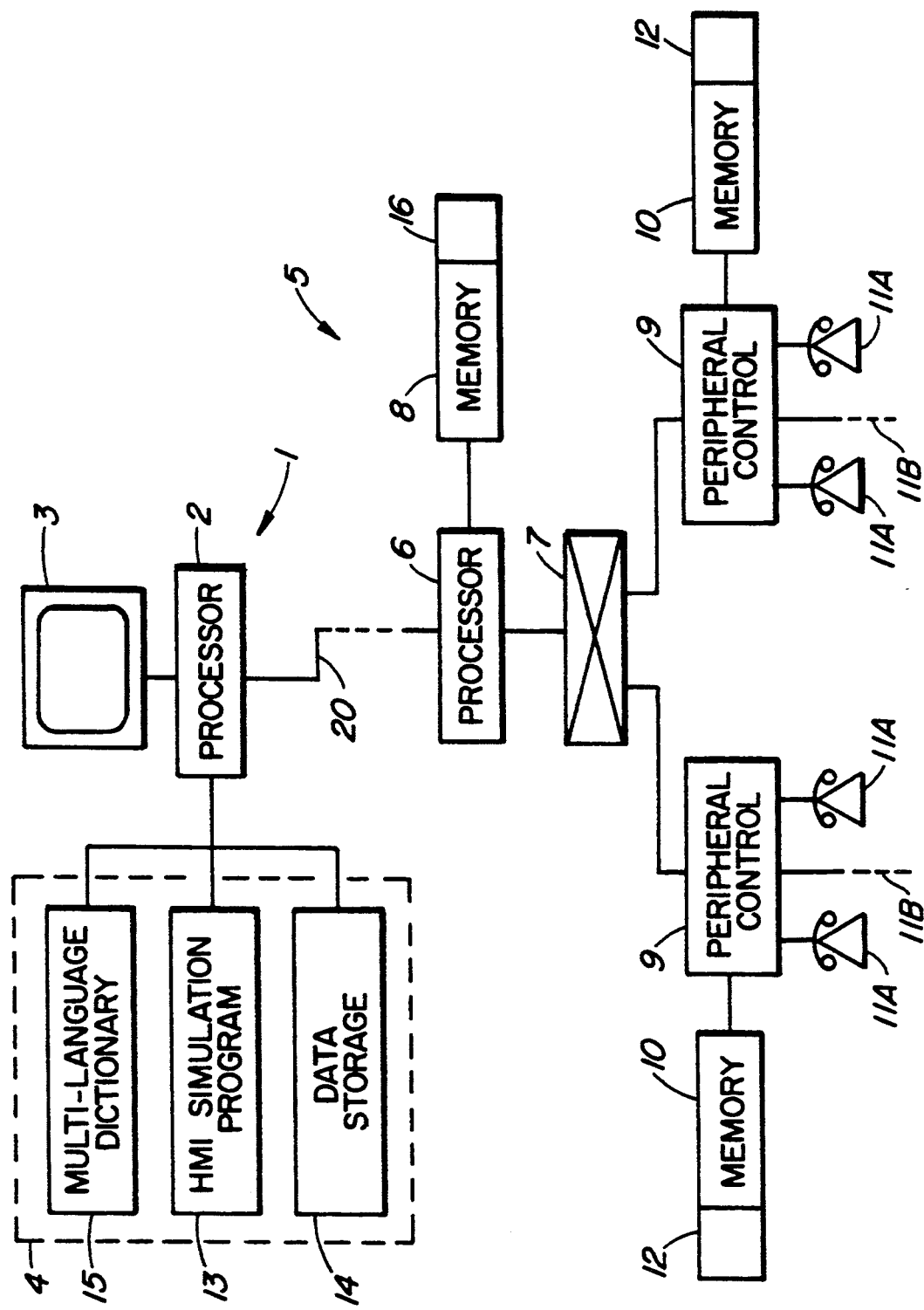
FIG. 1 is a block diagram illustrating a system arrangement for carrying out the method of the invention.

Turning to FIG. 1, a remote host system 1 is illustrated, which typically is comprised of a processor 2, display 3, etc. The processor accesses a memory 4 which can be subdivided into sub-memories as described below. The switching system 5 is comprised of a central processor 6 which operates a switch 7, and accesses memory 8. The operation programs for the processor 6 are stored in memory 8.

Peripheral control systems 9 are connected to switch 7, and either through switch 7 or via other links not shown to processor 6 for communicating with and control thereby. The peripheral systems can access peripheral memories 10, e.g. for storage of control programs for peripherals 11a (e.g. telephone sets), and 11b (e.g. trunks).

According to the prior art, the peripherals operate under control of programs stored in memories 10. Features are invoked by pushing pushbuttons on the telephone sets, causing signals to be transmitted to the peripheral systems which access software stored in a memory 10; or by means of signals arriving at a peripheral system 9 through switch 7 from another peripheral system, similarly causing software programs in a memory 10 to operate, thereby transmitting control and display signals to a local telephone set; or by the peripheral system receiving control signals from processor 6, resulting in peripheral control software programs being retrieved from a memory 10, whereby a local telephone set is controlled and/or characters are displayed on the set display.

For the present invention to operate, programs in memory 10 controlling operation of peripheral telephone sets are generic for all sets of a particular class, and those programs and steps which are to be used to define the operation of particular telephone sets are defined in a data table 12 stored in memory 10. Therefore the combination of the software programs and the data table defines the characteristics of each telephone set and each other peripheral such as the particular form of trunk to be used and signals to be recognized or transmitted thereby.

The remote host system 1 implements a human machine interface (HMI) to both model (define) and test prototypes of each of the peripherals. Models of the peripheral telephone sets were successfully implemented on a Sun Microsystems workstation, which formed the remote host system. An HMI generating program referred to as DEVGUIDE, by Sun Microsystems, provides an HMI editor. Operation of DEVGUIDE will be understood by persons skilled in the art and is described in the Open Windows Developer's Guide, dated Feb. 5, 1990 and available from Sun Microsystems. That guide and other publications referred to therein are incorporated herein by reference.

The human-machine-interface simulation programs are stored in memory 13, for access by processor 2, and are created using the DEVGUIDE program referred to above, from Sun Microsystems. While this facilitates creation of the HMI graphic, it does not create the telephone set simulation programs. Rather than simulation programs, the real programs from the switching system are preferred to be used in the host system, whereby the real programs can be exercised in the simulation system with the data table to be downloaded into the real system.

Provision of the HMI by use of the DEVGUIDE provides compiled software programs for generation of an e.g. telephone set graphic, and results in enable signals when, for example, graphic telephone set buttons are pushed by clicking a mouse pointer on the buttons, by displaying alphanumeric characters in a graphic of a telephone set display, etc. The user of DEVGUIDE is instructed to create his own programs for operation of the system.

In accordance with the present invention, the programmer creates a simulated prototype of the real peripheral which reacts in accordance with the result intended from pushing a button, etc. on the HMI interface which is modelled on the display 3 of the host system. The simulated peripheral, created in computer software, is then tested as a prototype. The simulation programs are created so as to provide a control table of data, in which the data corresponding to the modelled prototype corresponds to the data to be stored in data table 12 of the actual physical switching system. Once the modelled prototype has been successfully tested, a link 20 between the remote host system processor 2 and the switching system processor 5 is established and the control table which has been stored in data storage 14 is downloaded from processor 2 to processor 5. Processor 5 transmits the control table of data to peripheral system 9 which stores it in data table 12 of memory 10. This establishes the parameters for operation of a particular single peripheral, class of peripherals or all peripherals connected do the peripheral system 9.

The process of updating data table 12 can be done in real time so long as it does not occur while a previous data table for a particular peripheral in use is not being processed.

Figure 2:
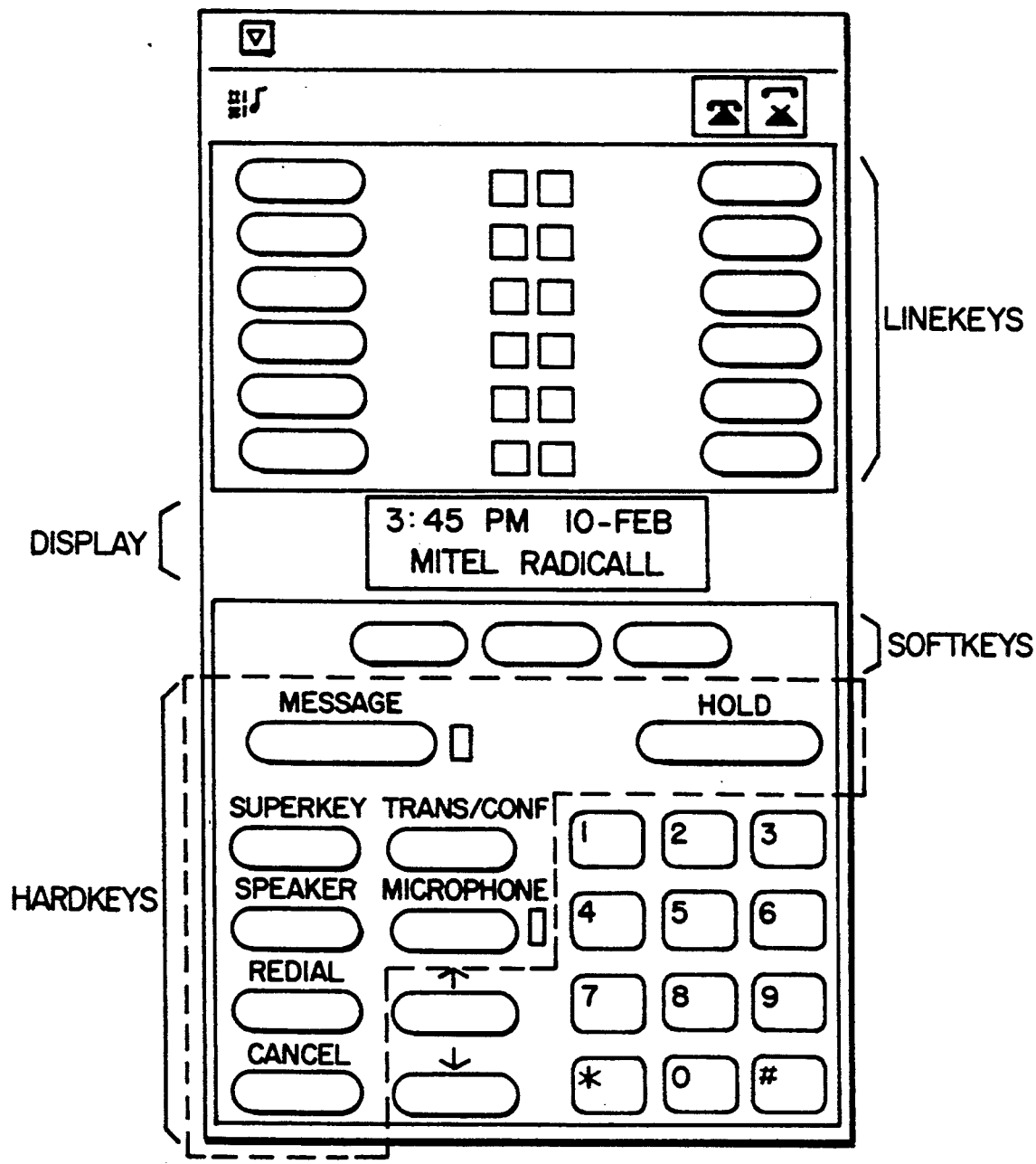
FIG. 2 is a graphic of the face of a telephone set created using an HMI.

FIG. 2 illustrates a graphic of a telephone set peripheral created using DEVGUIDE on the remote host system and displayed on display 3, in accordance with a successful laboratory prototype, which will be used as the example described below. The graphic can illustrate in a default configuration, the maximum number of feature enabling buttons and displays to be offered on a most featured telephone set being displayed, for example. While a default configuration need not be used, if desired, it is preferred to be used since the user need only change the portions of the HMI of immediate interest or remove buttons, displays, etc. as desired.

In the telephone set prototype modelled and shown in FIG. 2, the following attributes are provided: eight hard keys with two light emitting diodes, volume up and down keys, a speaker on and off key, a microphone, twelve line appearances with associated liquid crystal display indicators, three soft keys and a 2-×-16 character display.

It should be noted that HMI customizations relating to a particular device will usually only be applied against the corresponding real devices. Thus HMI changes made relating to one type of telephone set may not apply to another type of telephone set.

The text information appearing on the telephone set display can be modified to show anything the designer wishes, limited only by the display size and character set supported by the peripheral equipment. Different information can be displayed for each different device state, and different information elements can be displayed such as time and date, total call time, user's name, user's extension number, etc. The contents of these information elements are changed dynamically by the telephone system depending on what has been established using the host system and stored in table 12.

Figure 3:
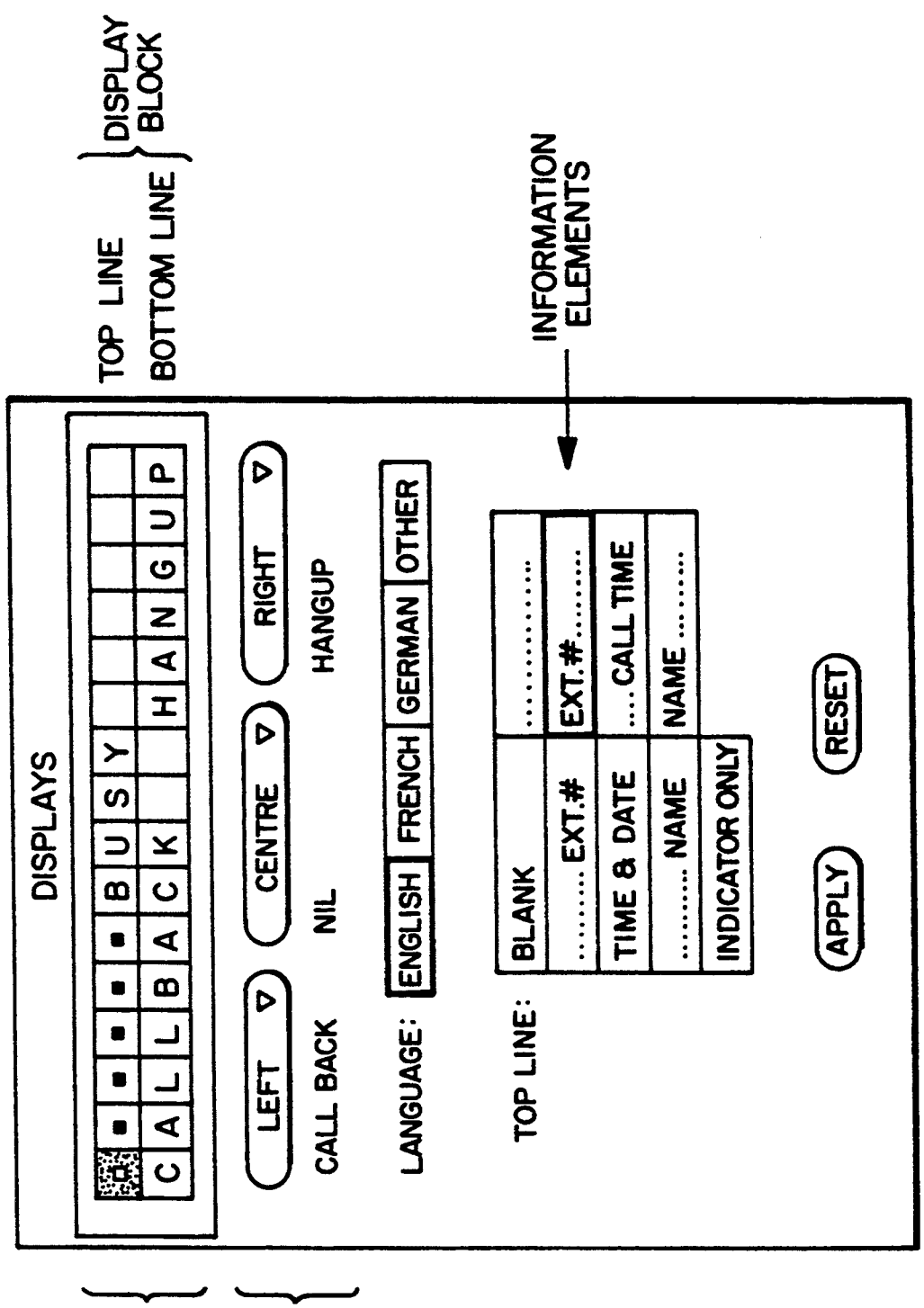
FIG. 3 is a graphic of a display editor window.

In order to edit the display on the telephone set model, a display editor window such as that shown in FIG. 3 may be used. The top line is a general information line and may be customized by selecting from a list of information elements, or by entering text. Some information elements use only part of the display line, using the remainder of the line for text, which can then be customized, as shown in FIG. 3. The selection buttons in the top line (designated by dots) may be invoked. When an information element is selected, the top line of the local display will change accordingly, indicating which characters are reserved.

The bottom line of the display is a text line, which usually provides some indication of the meaning of soft keys (the keys just below the display) and is typed in by the designer. The text line is customized simply by typing into the bottom line and applying the change as each calling state (and associated display) is traversed. The customization takes effect when the Apply button is selected.

In the successful embodiment, the language of the display may be selected, three specific languages being provided for. This selects a text dictionary, which retrieves all presentation text in the system from a multilanguage dictionary 15 in memory 4. The multi-language dictionary is comprised of various subdirectories, each specific to a language, and accessed by the host processor 2. Text dictionary files are language-dependent string files used by the application. The text dictionary retrieves any single line within a specified file in a given language. It is preferred that each language directory should contain the same number of files with the same names so that changing languages can be easily done with a change in the text dictionary file path.

Thus, for example, by designing the system in English and then changing to French, the corresponding strings in another dictionary can be invoked, changing all of the display alphanumerics into the other language. Similarly, by selecting a particular language, the alphanumerics displayed in the prototype model graphic changes to that language, by accessing the corresponding strings in the other language selected.

Figure 4:
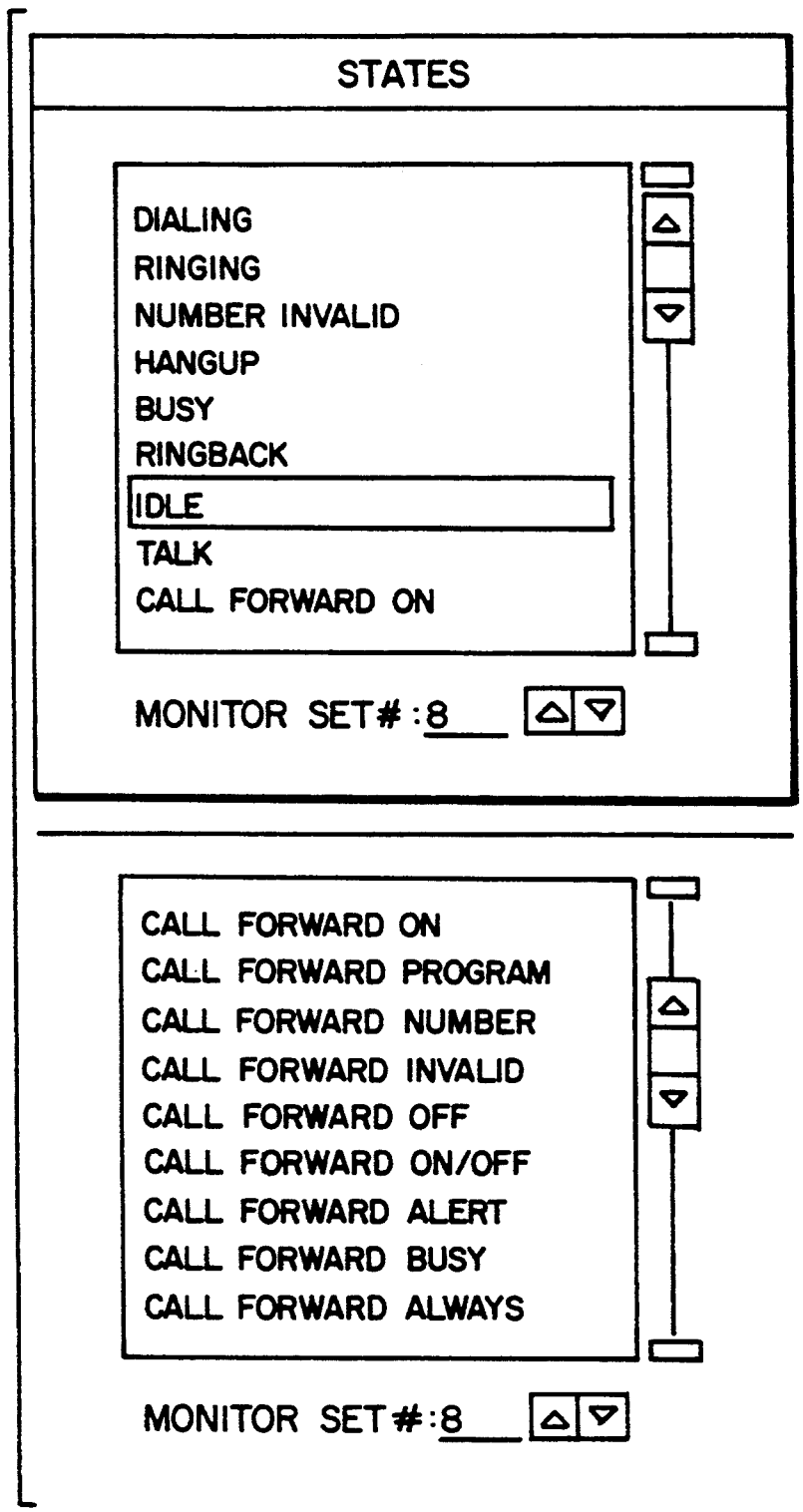
FIG. 4 illustrates windows of state information for display blocks to be presented in a telephone set to be presented.

The HMI editor is preferred to utilize call processing state information to determine what display blocks should be presented. The state information is shown in the windows reproduced in FIG. 4. Preferably there is a 1:1 correlation between each unique display block and each device state. The HMI editor therefore requires a unique index to reference the display block for the reference telephone set. If the display information is modified, the HMI editor therefore may use the index to identify the text to be modified.

The soft key function definitions and associated text descriptions are preferably customized for all devices that provide soft keys. The soft key functions and text displays should be configured for each unique device state. The designer selects those functions which could potentially be valid for the user of a given device and are selected as available options. Once the designer has configured the functions of the soft keys, the text above the soft keys is modified to provide a description of the soft key meanings. Each piece of text should be tied to a specific soft key, although it may extend over another soft key on the display.

The soft keys are preferred to be customized for the most general case, i.e. the situation where all possible features are valid. For example, if call waiting is a valid feature, the feature to pick up a waiting call should be offered as a valid soft key in the talk state. If there is no waiting call during system operation, the soft key should be undefined and its text description blank.

The left, center and right soft keys L, C and R shown in FIG. 3 provide a menu indicating the selections which may be assigned to them. For example, call forward, extension and NIL may be the valid options in the idle device state. Any of these options may be assigned to any soft key. In order to customize a soft key a selection should be made from the menu. The selections which are available relate directly to the calling state of the simulated set, i.e. to customize the soft keys for the call forwarding state, the set must first be put into the call forwarding state. The action which is assigned to a soft key then corresponds to a state transition.

The line keys are programmed for line appearances, busy lamp fields, feature access, or speed calls. Only feature access keys are preferably assignable from the HMI editor. This is because, for example, speed call numbers are programmed by the end user. A list of valid features should be provided, and the designer decides which features should appear on which keys. The LCD displays adjacent to the keys should be used to indicate the status of the feature represented by the key.

Figure 5:
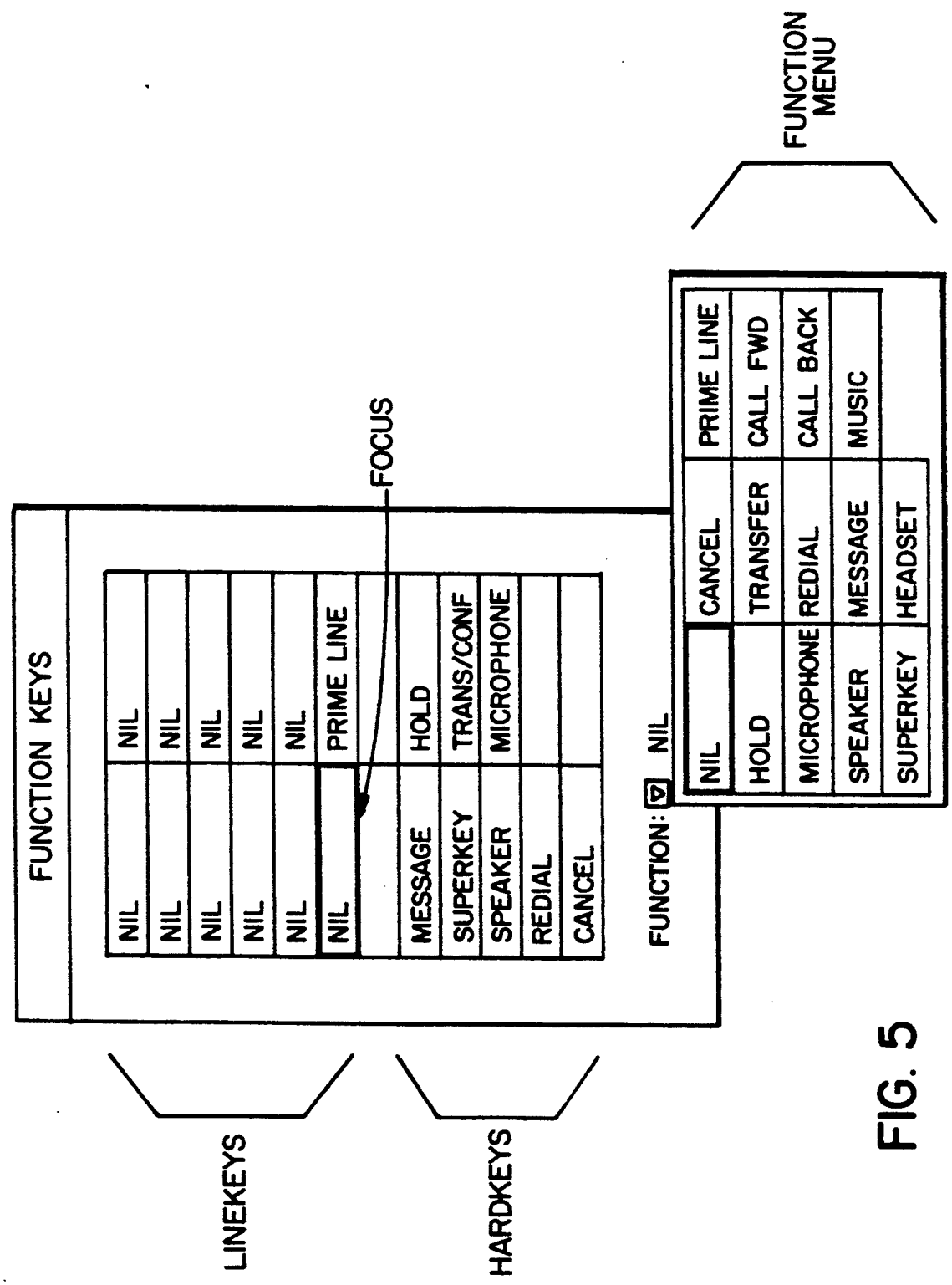
FIG. 5 illustrates a graphic of a window showing key designations of a simulated telephone set.

The line key and hard key designations, together referred to as function keys, are preferably both accessed from the same window, as shown in FIG. 5. The top set of keys correspond to the line keys, while the bottom set of keys correspond to the hard keys.

The designer selects a key, and then associates a feature with the line key or hard key. The function menu box at the bottom of that window as shown, causes a function menu to be displayed which contains all features available for association, also shown in FIG. 5. When the user selects an item from this menu, it should be immediately associated with the key selected (shown with a thick black line and the designation "focus").

Line keys are distinguished from hard keys by their LCD indicators. The window shown in FIG. 6 provides basic customization access to the line key indicators. The user selects a feature, thus bringing a particular line key into focus. The user then selects one of the settings displayed in FIG. 6. The behaviour described by a selection then is immediately applied to the designed line key indicator on a simulated telephone set. For example, selecting Slow Flash should cause the indicator to start a slow flash cycle.

The line key functions are stored with the key identifier in the table. When the line keys are customized, the table entries for the modified keys should be updated with the new function. The table entries for the modified keys are then updated with the new functions. If the customization is on an individual telephone set basis, a different table should be created for each telephone set.

The hard keys are the function keys on a device that do not have associated LCDs. These are keys that are used specifically for feature activation, and not for line appearances or busy lamp fields. In the prior art, the subscriber using the telephone set, and the telephone company (or PABX owner) had no ability to change the definition of any hard keys. With the present invention, the hard keys can be redefined to access any of the available features of interest to the subscriber. To support this redefinition, it is preferred that hard keys on the real telephone sets should have associated printed cardboard inserts carrying the associated definitions, rather than the definitions being printed directly on the telephone set housing.

Hard keys are accessed and customized as described with respect to the line keys.

Hard keys normally will have the same function regardless of state, and the key function is stored with the key identifier in the table. When the hard keys are customized, the table entries for the modified keys are simply updated with the new function.

Call progress tones, such as busy tone, ring-back tone, etc. can be selected from a list by the designer, although it is preferred that call progress tones should not be modified in order to maintain standardization across the nation. However, different types of ringing for different states should be able to be customized using the present invention. In the case of tone and ringing configuration alteration, a window such as that shown in FIG. 7 could be used to customize the prototype model. The call progress tones to be applied to certain states can be contained in a database associated with a state index in the table used to reference the display and soft key information.

Figure 8:
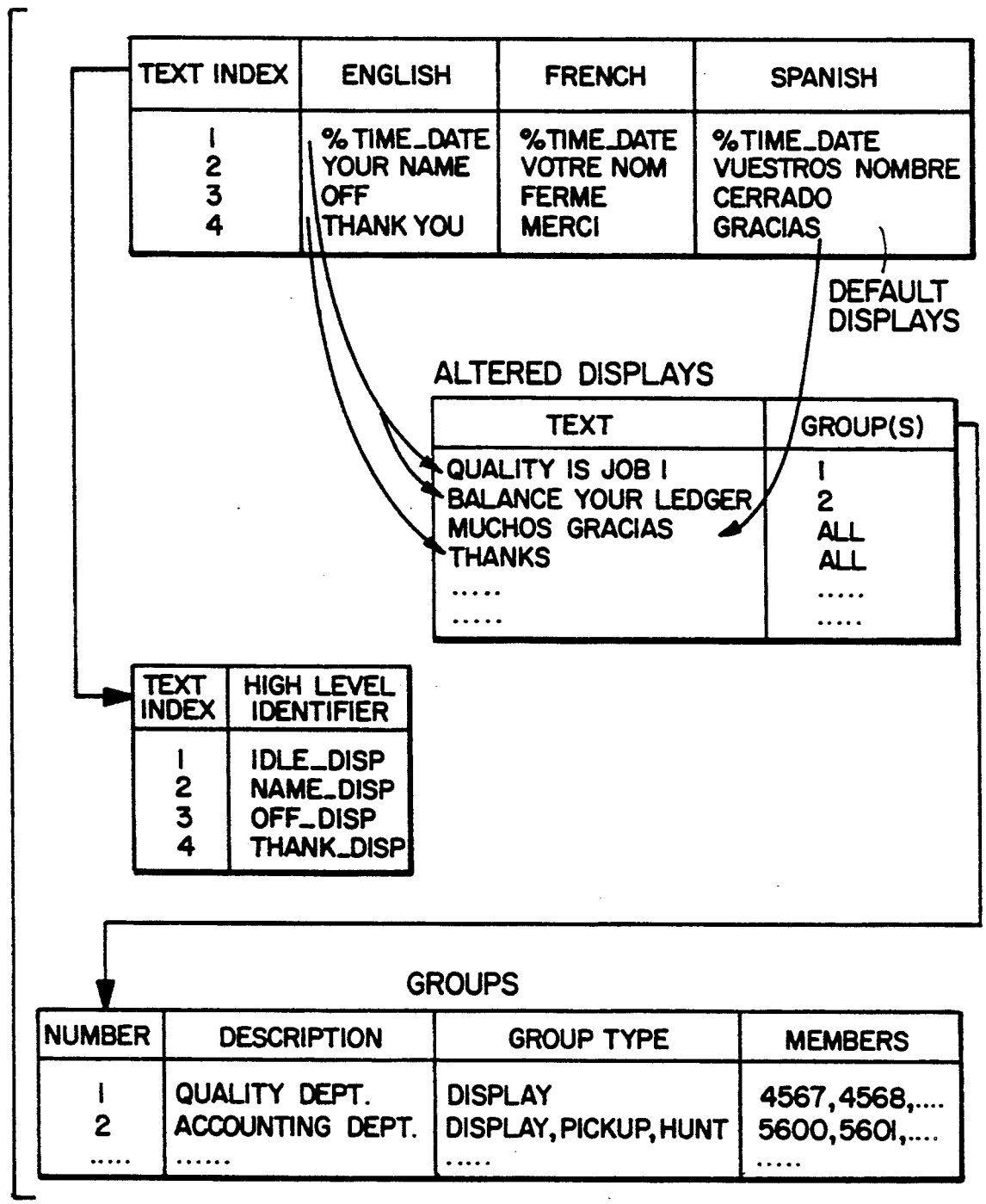
FIG. 8 illustrates states for several languages.

FIG. 8 illustrates default states for the languages supported. Each entry is identified by an index, which is associated with a certain point or points in a telephone call. For example, index 1 is associated with the idle state. While in the idle state the operation software references index 1 and extracts the appropriate text from the database and displays it on the host display 3.

For each index there is preferably an equivalent to display in every language that is supported. This structure is preferred because there will be no difference in functionality for different languages, but only differences in the user interface. Therefore for any state in the call there should be some appropriate display in every language.

The altered displays table shown in FIG. 8 contains all of the displays that have been altered using the HMI editor. The pointer connects the default and altered displays. Altered displays apply in one language only. For example, to change the English "thank you" and the Spanish equivalent "gracias", two changes were required to be made.

The altered displays can apply to an individual peripheral, a group of peripherals, or system-wide. The parameter "All" in the altered displays table implies that changes are system-wide. Otherwise if the display applies to a particular group, that group number (or name) is indicated in the table. In the present example, the quality department's idle display has changed to a motto, "Quality is job 1". Similarly, the accounting department's idle display has been changed to "Balance your ledger".

The thick arrow from "altered displays" to the "groups" table show how the two tables are related. The groups table contains the number, name, members and the type of group.

The "display" group is one that contains a set of end users who are grouped together because of their need for similar functionality and HMI of the actual peripheral. Other groups available in the system may be provided, such as "pickup" groups, in which users are grouped by location of their desks, whereby they can utilize a call pickup feature. The different types of groups may or may not contain different members. In the example shown, group No. 2 contains users who have the same HMI and are also in the same pickup and hunt group. To accommodate customizations on an individual basis a group of type "display" is created that contains one member.

Stimulus to the modelled prototype is obtained graphically by clicking on the buttons using the mouse pointer, e.g. see FIG. 2. Indicators on the device such as displays, lamps and audio tones, preferably should be utilized to provide graphical feedback in much the same manner as a physical device. Multiple instances of the device should be created and displayed for multiple devices, so that features requiring multiple devices (e.g. conferencing) can be simulated.

Figure 9:
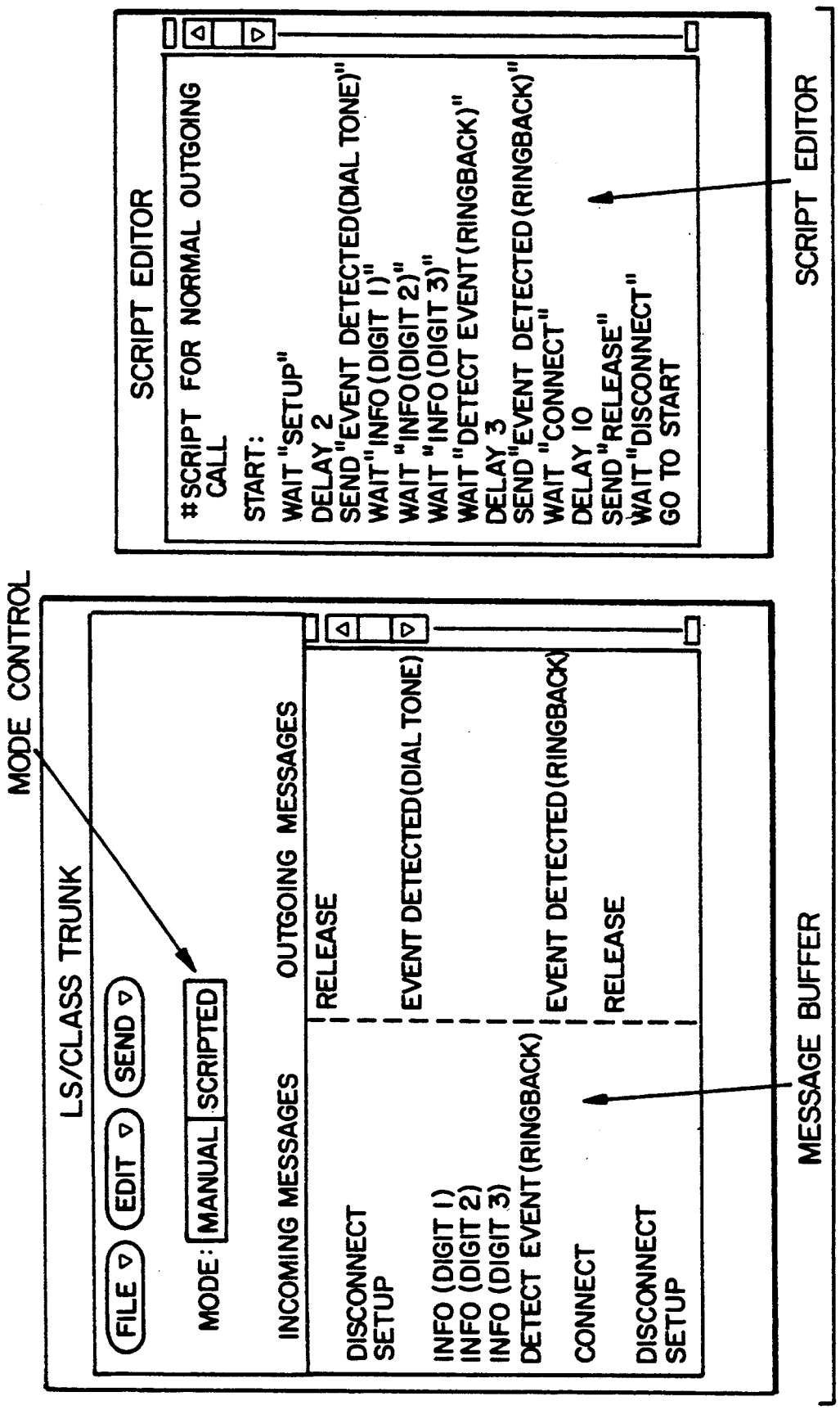
FIG. 9 illustrates windows for implementation of a simulated trunk.

FIG. 9 illustrates windows for implementation of a simulated network interface peripheral, in this case an LS/CLASS trunk.

Messages between application software and the simulated network interface are displayed in human readable form in the message buffer shown in the columns "incoming messages" and "outgoing messages". A mode control determines the way in which the simulated device operates. In the manual mode, the user can send arbitrary messages to the application software. In the scripted mode, the user can create a model of the network interface as well as the network itself using a scripting language. In this mode the simulated device acts as a state machine which automatically responds to messages from the application software, according to the scripts provided by the user. Scripts can be created and stored using a script editor.

Using the prototype model, the designer can exercise the application software and view the changes made with the HMI editor. HMI changes can be quickly tested, without affecting subscribers connected to the switching system 5. Record/playback software tools can be used to record sequences of user actions, and call scenarios can be replayed for testing and demonstration purposes.

In the prototyping environment, the operation system of the switching system is simulated, providing the same functions to the application software as the switching system, but in reality executes under the remote host operating system. The application software is the same as that running normally in the switching system 5, but recompiled for the remote host system.

Simulated application layer interface software system should present the same interface to the application software as that which runs on the switching system, but should differ in that it should communicate with simulated devices, rather than real peripherals.

Terminal equipment devices such as telephone sets should be simulated using the graphical representations of the physical device, as described above. This can be typically provided using protocol conversion from the application software of the telephone system to the user interface software which interacts with the user. Thus the messages between the application software and the simulated device are required to undergo protocol conversion between the application specific to the protocol and the internal representation used by the simulated device. Messages from the application software are thus converted into events which are presented graphically to the user by the user interface component. Similarly user initiated events such as key presses are received, converted to messages, and sent to the application software. Each distinct type of terminal equipment requires a different simulation model.

Network interfaces such as trunks, should also be separately simulated. The designer should be able to view the message stream between the application software and simulated network interface. In the manual mode, noted above, arbitrary messages can be sent to the simulated interface to the application software. Using the scripted mode, the designer can define the behaviour of the network itself, and the simulated network should respond to messages from the application software according to the user-defined script.

Messages from the application software undergo protocol conversion between the application dependent protocol and the internal representation used by the simulated network interface, as described above. A message monitor should cause display of the messages between the application and the simulated device in a human readable format. The messages should be stored in a buffer that can be reviewed by the user or optionally saved to a log file.

A mode control can be used to determine the simulation mode. In manual mode, the user can send the aforenoted arbitrary messages to the application software. A message editor can be used to allow the user to select from the available messages.

In the scripted mode, messages between the application software and the simulated interface should be controlled by a script language interpreter. The interpreter is a state machine that uses a user-defined script to define the desired behaviour. This allows simulation of the network itself. By creating appropriate scripts, the application software can be exercised and placed in appropriate states so that the user can observe changes made using the HMI editor. Scripts can be created by the designer using a script editor, and stored in one or more script files.

Preferably, the data tables of the switching system 5 should be able to be uploaded to the host system in order to ensure that the host tables can be matched to those of the target system. The host systems data tables can be downloaded to a specific switching system to overwrite the data tables 12 stored therein. The designer should be given the option of connecting directly or remotely to the switching system. For example when connected directly, the host system can use a RS-232 link 20 via a data set connected to the switching system 5.

When connected remotely, the host system can be connected to the target system via a link 20 which is a telephone line using a modem on the host system, and by dialing the switching system.

It should be noted that since the features of particular telephone sets are defined uniquely or by group, automatic documentation can be used to provide user manuals. Therefore the host system can be configured to cause prestored documents relating to designated features, displays, soft keys, line key indicators and call progress tones specified for particular sets to be printed and distributed to the subscribers.

It should be noted that the data tables 12 can be implemented as real tables with sub-tables, or in other forms such as databases. The data tables may be stored in or associated with memories 10, in or associated with the peripherals themselves, or in associated region 16 of memory 8, or in a separate memory 16, in the switching system 5.

It is preferred that the HMI compiled programs, editor and simulator computer software should be provided to the telephone company, to operate on the remote host system of the telephone company. The customization for that system, or other systems, can then be effected by using the HMI editor and simulation programs.

A person understanding this invention may now conceive of alternative structures and embodiments or variations of the above. All of those which fall within the scope of the claims appended hereto are considered to be part of the present invention.

The embodiments of the invention in which an exclusive property or privilege is claimed are defined as follows:

1. A method of defining the operation of switching system peripherals comprising:
    (a) storing a generic software program for operating all peripherals of a particular class in a peripheral controller of a switching system;
    (b) storing at least one table of data for access by said program for defining operating parameters of a particular peripheral in the peripheral controller;
    (c) modelling a prototype of said peripheral in a remote host system by creating a human-machine-interface simulating said peripheral;
    (d) storing a control table of data corresponding to said modelled prototype in a memory of said host system; and
    (e) downloading said control table into said at least one table, whereby operation of said peripheral is controlled by said generic software program and the data in said at least one table.

2. A method as defined in claim 1, in which at least some of said peripherals are telephone sets.

3. A method as defined in claim 2 in which said modelling step includes displaying a graphic human-machine-interface on a display which simulates any of pushbuttons, keys, and displays of said telephone sets, enabling operation of selected ones of said pushbuttons and keys on said graphic human-machine-interface and operating a telephone set simulation program to verify the operation of a simulated telephone set using said control table of data.

4. A method as defined in claim 3 in which the step of displaying said interface on a display includes the step of establishing a particular form of telephone set graphic with proposed features on said display, which corresponds to a particular form of actual telephone set with desired features to be used by a particular subscriber.

5. A method as defined in claim 1 in which at least some of said peripherals are trunks.

6. A method as defined in claim 4 further including accessing a multi-language dictionary stored in said host system, using a particular language of said multi-language dictionary, and in which said modelling step includes establishing data for storage in said control table for controlling a display on said telephone set of characters corresponding to any of plural languages.

7. A method as defined in claim 2, in which said switching system is comprised of at least one peripheral control system, and including the step of storing the control table and said software program in a memory accessed by and associated with a corresponding said at least one peripheral control system.

8. A method as defined in claim 2, in which said switching system is comprised of a central control processor, and including the step of storing the control table and software program in a memory accessed by said central control processor.

9. A method as defined in claim 2, including the step of storing the control table in a telephone set.

10. A method as defined in claim 3, including converting programs of said telephone sets from said switching system into a protocol operable on said remote host system, loading the converted programs into the remote host system, and using the converted programs as at least part of said simulation program.

* * * * *